United States Patent
Gramlich et al.

(10) Patent No.: US 10,059,022 B2
(45) Date of Patent: Aug. 28, 2018

(54) ADJUSTING DEVICE FOR A PRESSURE ROLLER OF A PROCESSING MACHINE, PARTICULARLY A MOULDING MACHINE, AND PROCESSING MACHINE, PARTICULARLY MOULDING MACHINE, WITH SUCH AN ADJUSTING DEVICE

(71) Applicant: Michael Weinig AG, Tauberbischofsheim (DE)

(72) Inventors: Rainer Gramlich, Ravenstein-Oberwittstadt (DE); Walter Rapp, Königheim-Gissigheim (DE); Ralf Wagner, Hardheim (DE)

(73) Assignee: Michael Weinig AG, Tauberbischofsheim (DE)

( * ) Notice: Subject to any disclaimer, the term of this patent is extended or adjusted under 35 U.S.C. 154(b) by 389 days.

(21) Appl. No.: 14/928,663

(22) Filed: Oct. 30, 2015

(65) Prior Publication Data
US 2016/0121510 A1    May 5, 2016

(30) Foreign Application Priority Data

Nov. 4, 2014    (DE) .................... 10 2014 016 630

(51) Int. Cl.
*B27B 25/02* (2006.01)
*B23Q 3/00* (2006.01)
(Continued)

(52) U.S. Cl.
CPC .............. *B27B 25/02* (2013.01); *B23Q 3/002* (2013.01); *B27C 1/12* (2013.01); *B27C 5/06* (2013.01)

(58) Field of Classification Search
CPC .. B23Q 3/002; B27C 5/02; B27C 5/04; B27C 5/06; B27C 1/12; B27B 25/02
(Continued)

(56) References Cited

U.S. PATENT DOCUMENTS

| 3,680,611 A | 8/1972 | Mitten et al. |
| 6,029,722 A * | 2/2000 | Englert ................. B23B 31/006 144/114.1 |

(Continued)

FOREIGN PATENT DOCUMENTS

| AT | 365 506 | 1/1982 |
| DE | 1 227 635 | 10/1966 |

(Continued)

*Primary Examiner* — Matthew G Katcoff
(74) *Attorney, Agent, or Firm* — Gudrun E. Huckett

(57) ABSTRACT

The adjusting device for a pressure roller of a processing machine has a pivotable support arm carrying a pressure roller adjustable with the support arm from a pressure position into a resting position. The support arm is seated on a support rod that engages a clamping aperture of a pressure roller bracket. The support rod has a first section with noncircular cross section that forms a form-fit section cooperating with the clamping aperture of the pressure roller bracket by form-fit. The support rod has a second section arranged axially offset to the first section and forming a rotary section. It rests against the inner side of the clamping aperture and allows rotation of the support rod about its axis in the clamping aperture. The pressure roller can be pivoted easily into a resting position and/or transverse to the workpiece in the width direction with a constructively simple design.

26 Claims, 14 Drawing Sheets

(51) Int. Cl.
*B27C 1/12* (2006.01)
*B27C 5/06* (2006.01)

(58) Field of Classification Search
USPC ......... 144/246.1, 246.2, 248.4, 248.5, 248.6, 144/248.7, 250.1, 250.11, 253.6
See application file for complete search history.

(56) References Cited

U.S. PATENT DOCUMENTS

| | | | | |
|---|---|---|---|---|
| 8,360,120 | B2 * | 1/2013 | Chuang | ................... B27C 1/12 144/114.1 |
| 2014/0360627 | A1 * | 12/2014 | Sung | ................... B27B 25/02 144/248.4 |

FOREIGN PATENT DOCUMENTS

| | | |
|---|---|---|
| DE | 35 12 088 A1 | 10/1986 |
| DE | 10 2012 006 124 A1 | 9/2013 |
| EP | 0 683 021 A1 | 11/1995 |
| EP | 2 159 022 A2 | 3/2010 |

* cited by examiner

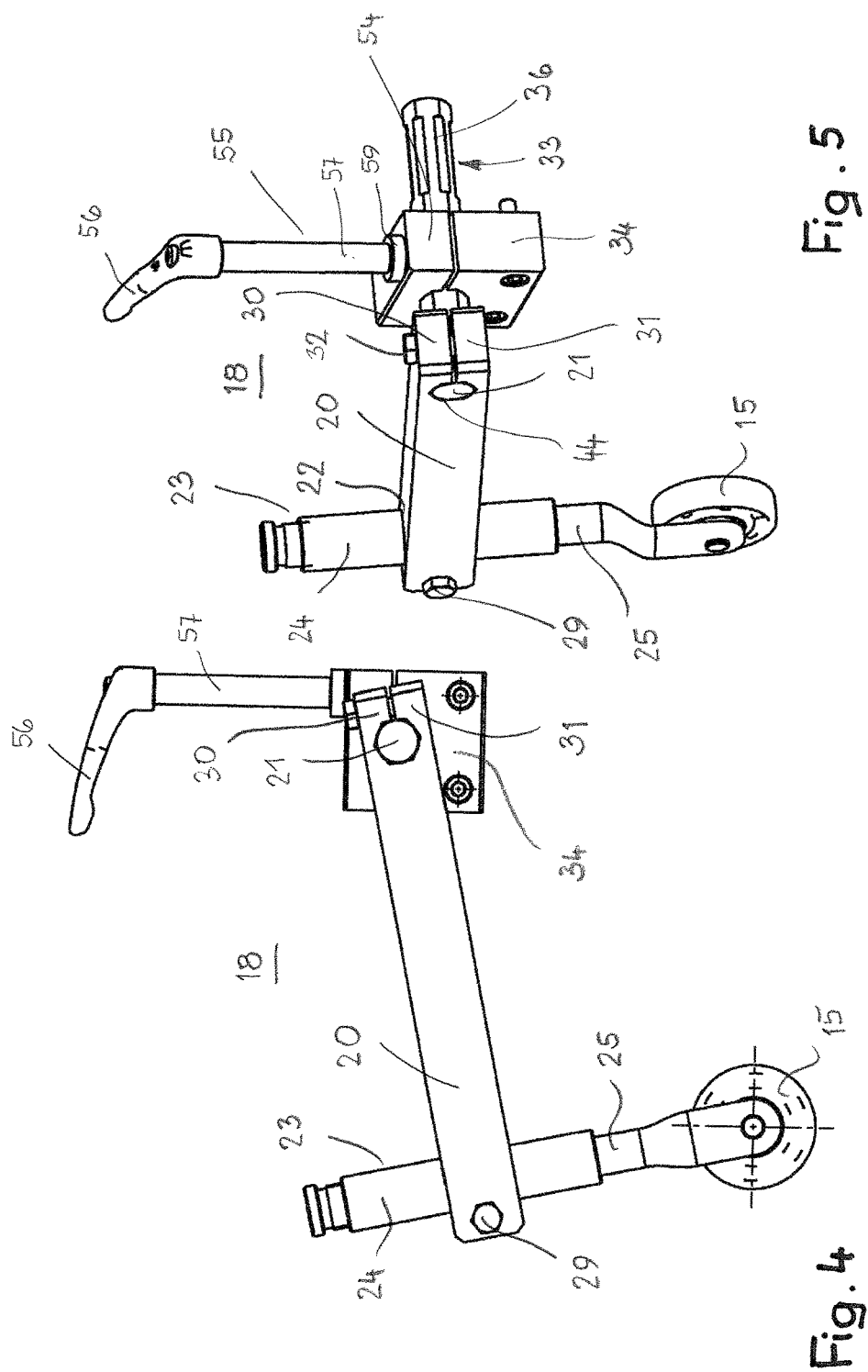

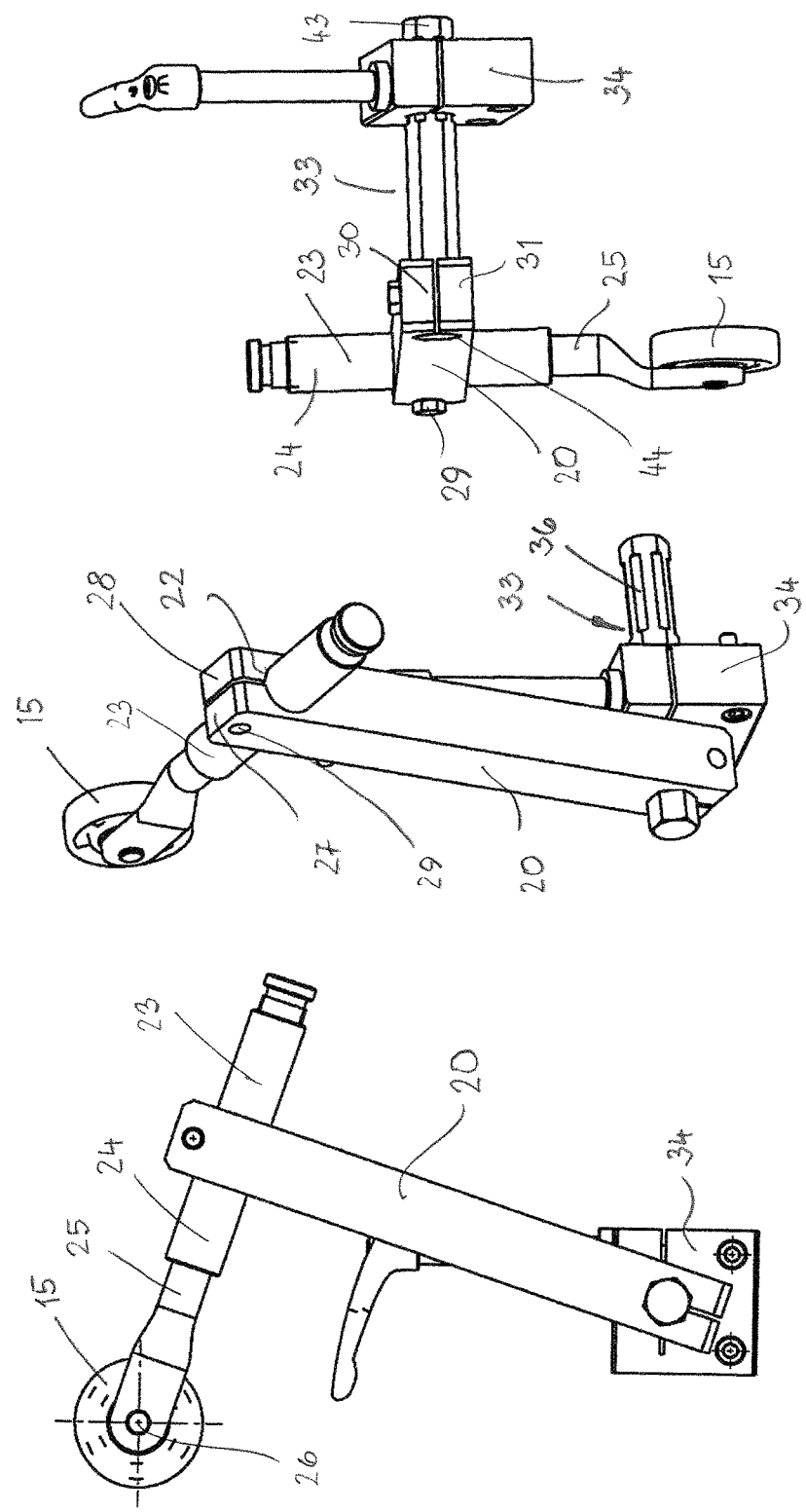

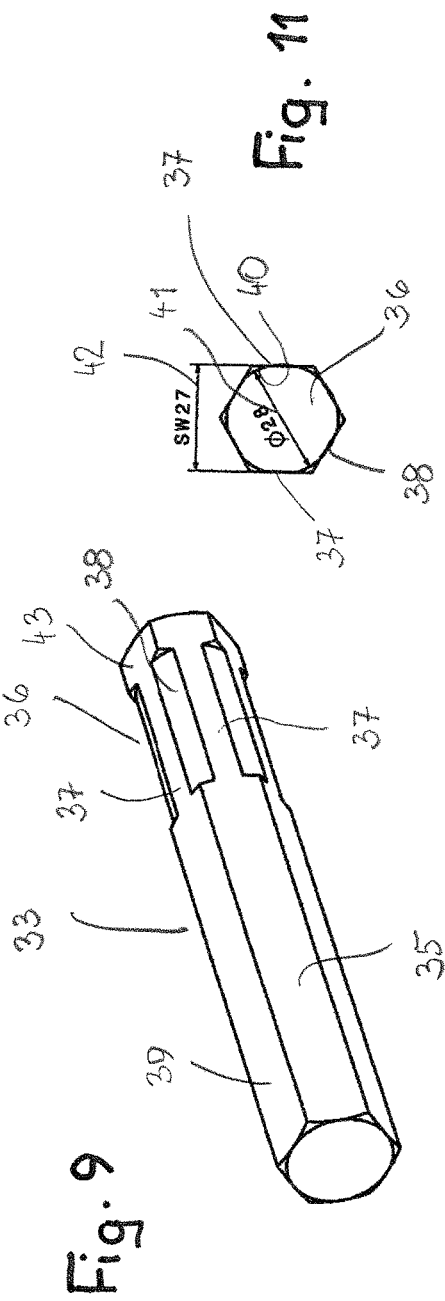
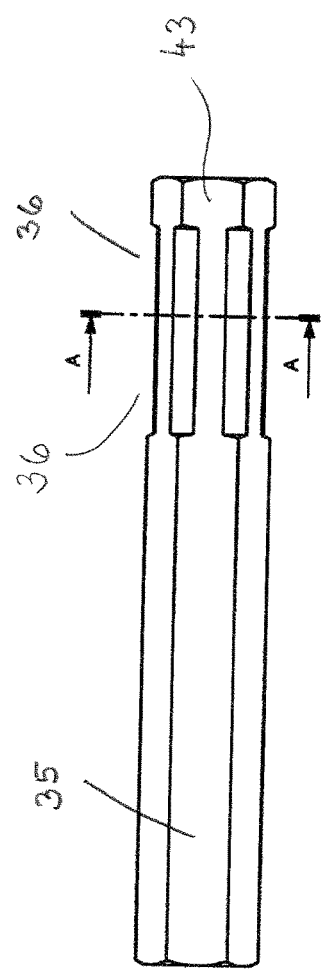

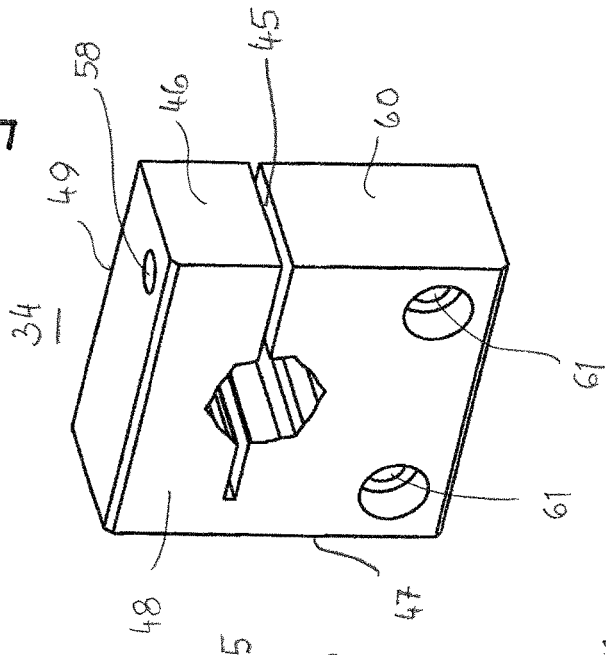
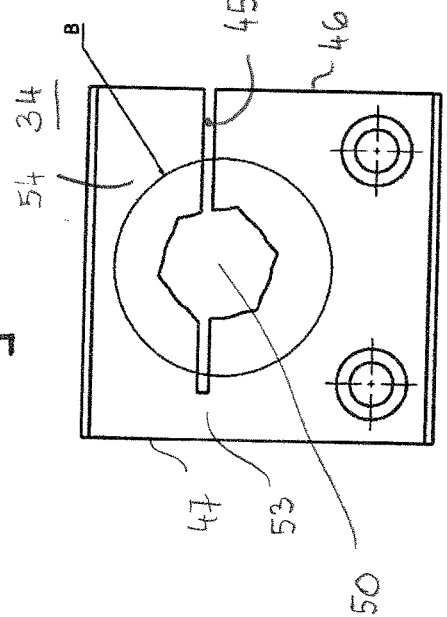
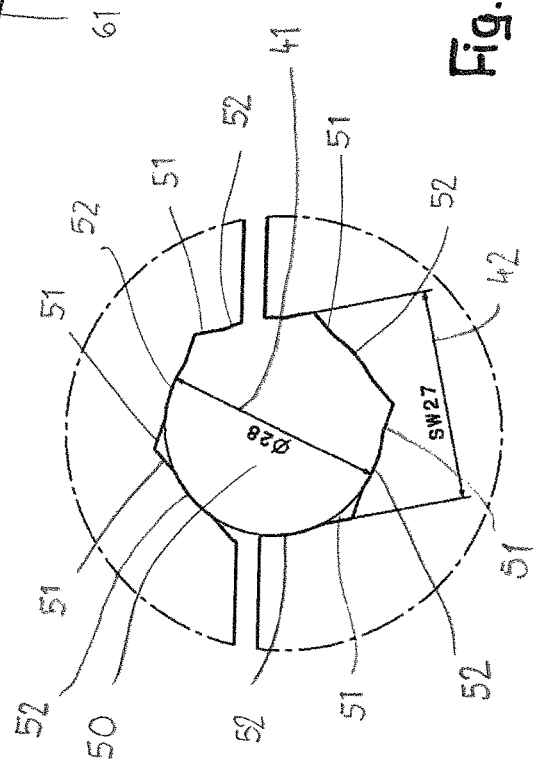

ADJUSTING DEVICE FOR A PRESSURE ROLLER OF A PROCESSING MACHINE, PARTICULARLY A MOULDING MACHINE, AND PROCESSING MACHINE, PARTICULARLY MOULDING MACHINE, WITH SUCH AN ADJUSTING DEVICE

BACKGROUND OF THE INVENTION

The invention pertains to an adjusting device for a pressure roller of a processing machine, particularly a moulding machine, for workpieces of wood, plastic and the like, with a support arm that can be pivoted about an axis and carries a pressure roller that can be adjusted from a pressure position into an resting position by means of the support arm, wherein said support arm is seated on a support rod that engages into a clamping aperture of a pressure roller bracket. The invention further relates to a processing machine, particularly a moulding machine, with an adjusting device of the aforementioned kind.

In processing machines, particularly moulding machines, it is known to transport the workpieces through the processing machine by means of transport rollers and to thereby continuously process the workpieces. Pressure rollers are provided in the region of the tools that rotate about a vertical axis and press against the workpiece to be processed in addition to the transport rollers. The tools have to be exchanged depending on the processing task. In this case, the pressure rollers have to be removed in order to carry out a tool change. In conventional processing machines, the pressure rollers are rigidly mounted such that significant installation effort is required when the tool located in the region of these pressure rollers has to be changed. In certain processing tasks, individual pressure rollers are not required or cannot be used and therefore also have to be removed.

It is also known to mount the pressure rollers on a pivoting arm, by means of which the pressure roller can be pivoted from a pressure position, in which it rests on the workpiece, into an resting position when a tool change is required or these pressure roller should not be used. However, the adjusting device provided for this purpose has a very elaborate constructive design.

In addition, pressure rollers have to be adjusted in the lateral direction transverse to the workpiece in dependence on the moulding depth of the right spindle, the workpiece width to be processed and the cutting diameter of the left spindle.

The invention is based on the object of designing the adjusting device of the initially cited type, as well as the processing machine, in such a way that the pressure roller can be adjusted into an resting position and/or transverse to the workpiece in the direction of its width with a simple constructive design and in an easily manageable fashion.

SUMMARY OF THE INVENTION

According to the invention, this object is solved in the adjusting device of the aforementioned kind in such a way that a support rod has a first section with noncircular cross section that forms a form-fit section and cooperates with the clamping aperture of the pressure roller bracket in a form-fitting fashion, as well as a second section that is arranged axially offset to the first section and forms a rotary section, wherein this second section rests against the inner side of the clamping aperture and allows a rotational motion of the support rod about its axis in the clamping aperture of the pressure roller bracket.

This object is further solved for a processing machine of the aforementioned kind in that it is provided with an adjusting device as described above.

The inventive adjusting device has the support rod, on which the support arm carrying the pressure roller is seated. The support rod has two sections with different cross-sectional designs. The first section of the support rod, which forms a form-fit section, has a noncircular cross section. In this context, the term noncircular cross section refers to any cross section that deviates from a circular shape such as, e.g., an angular, oval or polygonal cross section, a cross section with an involute profile and the like. The second section is a rotary section that rests against the inner side of the clamping aperture and allows a rotational motion of the support rod about its axis in the clamping aperture of the pressure roller bracket. The first section makes it possible to reliably and securely clamp the pressure roller in the clamping aperture of the pressure roller bracket in a form-fitting fashion. The clamping force acting upon the first section of the support rod is reduced to such a degree that the support rod can be axially displaced in order to move the second section into the region of the clamping aperture. The second section forms the rotary section such that the support rod can be turned about its axis in the clamping aperture. Since the support arm is rigidly seated on the support rod, the rotational motion of the support rod causes the support arm to pivot. In this way, the pressure roller can be very easily adjusted from the pressure position, in which it rests on the workpiece, into an resting position, for example, when a tool change is required in the region of this pressure roller. The pressure roller does not have to be removed and, if applicable, reinstalled in the resting position for this purpose.

In an advantageous embodiment, the second section of the support rod has an outer surface in the form of a cylindrical surface area. In this case, the support rod can be continuously turned.

In an advantageous embodiment, the diameter of the cylindrical surface area of the second section of the support rod corresponds to an inscribed circle diameter of the angular cross section of the first section of the support rod. In this case, the cylindrical surface area of the second section rests against plane inner sides of the clamping aperture of the pressure roller bracket with line contact such that the support rod can be turned about its axis. The angular cross section of the clamping aperture advantageously corresponds to the angular cross section of the first section of the support rod in this case. When the support rod is positioned in the clamping aperture with its first section, a flawless form-fitting connection between the support rod and the pressure roller bracket having the clamping aperture is therefore produced.

In another advantageous embodiment, the cylindrical surface area of the second section of the support rod rests against corresponding partially cylindrical inner sides of the clamping aperture of the pressure roller bracket. In this case, the clamping aperture alternately has partially cylindrical and plane inner sides. In such a design, the second section of the support rod can also be turned about its axis in the clamping aperture. The first section of the support rod with the angular cross section can be secured in a form-fitting fashion on the plane inner sides of the clamping aperture.

In another embodiment, the second section of the support rod alternately has plane and curved outer sides. The plane outer sides are set back relative to the curved outer sides to such a degree that only the curved outer sides form functional surfaces during the rotation of the support rod about its axis. They rest against corresponding curved inner sides of the clamping aperture provided in the pressure roller bracket.

The curved outer sides of the second section of the support rod and the inner sides of the clamping aperture preferably lie on the surface area of an imaginary cylinder, the axis of which forms the pivoting axis of the support arm. In this way, the support arm with the pressure roller can be adjusted into the resting position with a simple rotational motion of the support rod.

In an advantageous embodiment, the plane outer sides of the second support rod section form continuous continuations of the plane outer sides of the first support rod section. This allows a simple manufacture of the support rod. A rod with angular cross section, preferably with hexagonal cross section, is used as starting material. The curved surfaces can be easily produced on the circumference of this polygonal cross section, for example, by turning on a lathe. A square cross section, an involute profile, a polygonal profile and the like may also be used for the rod.

The outer sides of the second section of the support rod, as well as the inner sides of the clamping aperture, are realized in such a way that the diameter of the imaginary cylindrical surface area, on which the respective curved outer and inner sides lie, is greater than the distance between opposite plane outer sides of the second support rod section and of the clamping aperture (width across flats of the polygon of the first and second section).

The second support rod section is advantageously located in the region between the first support rod section and an end section of the support rod.

The two support rod sections may have different lengths. The second support rod section advantageously has a slightly greater length than the clamping aperture, in which the support rod is rigidly clamped. The first support rod section with the angular cross section is so long that the support arm for producing a rotationally rigid connection with the support rod can be fastened thereon and the support rod can be clamped in the clamping aperture in the required axial position.

The end section of the support rod preferably has the same cross section as the first support rod section. The end section may serve as a limit stop in order to prevent the support rod from being inadvertently pulled out of the clamping aperture during the pivoting motion.

The first section and the end section of the support rod may be arranged at identical angles, as well as angularly offset to one another.

The support rod can be displaced in the clamping aperture. When the pressure roller is in its pressure position, in which it rests on the workpiece, the support rod is displaced into the clamping aperture to such a degree that the first support rod section with the angular cross section is located in the clamping aperture. In this case, the plane inner sides of the clamping aperture are flatly placed against the plane outer sides of this first support arm section such that a flawless form-fitting connection between the support rod and the wall of the clamping aperture is produced. Consequently, the support arm and therefore the pressure roller are flawlessly positioned and held in the pressure position. If the pressure roller needs to be adjusted into the resting position, the support rod is after reducing the clamping force displaced in its longitudinal direction until the second support rod section lies in the clamping aperture. The corresponding outer sides of the second support rod section and the inner sides of the clamping aperture now functionally cooperate such that the support rod can be turned about its axis and the pressure roller can thereby be adjusted into the resting position by means of the support arm.

In an advantageous embodiment, the support rod and the clamping aperture of the pressure roller bracket may also be realized in such a way that the support rod can be clamped in the clamping aperture with all its sections, i.e. the first section, the second section and the end section.

In a hexagonal design, the support rod can be advantageously turned by a multiple of 60°. As soon as the support rod has been turned by the corresponding angle, it is axially pushed back such that the first section lies in the clamping aperture. The support rod can then be held and clamped in a form-fitting fashion. The pressure roller is reliably secured in the resting position in this case. In this way, an exact position of the pressure roller is predefined in the resting position such that a collision with other components is prevented and an unproblematic tool change can be carried out. In this resting position, it is furthermore possible to process workpieces, on which the pressure roller should not be used or is not needed, without any obstruction by the pressure roller. The partially cylindrical surfaces, which more or less overlap one another depending on the angular position, cooperate when the second section with the alternately arranged plane and curved outer sides is clamped in the clamping aperture. In the angular position adjusted in the working position, the partial surfaces only contact one another with their edges such that clamping is not possible.

A simple constructive design is achieved if the pressure roller bracket has at least one clamping section that exerts the clamping force upon the support rod. This clamping section is connected to the remaining part of the pressure roller bracket by means of a bending region.

The clamping section is advantageously realized in that a transverse slot, which extends as far as into the clamping aperture of the pressure roller bracket, is produced in the pressure roller bracket. This transverse slot separates the clamping section from the remaining part of the pressure roller bracket. Such a transverse slot can be very easily produced in the pressure roller bracket. The transverse slot ends at such a distance from the outer side of the pressure roller bracket that the region located between this outer side and the end of the transverse slot forms the bending region of the clamping section. A simple and cost-effective manufacture of the pressure roller bracket is achieved due to the one-piece design of the clamping section and the remaining part of the pressure roller bracket.

The transverse slot is realized in such a way that it extends through the clamping aperture, preferably at half its width. In this way, the support rod can be reliably clamped in the clamping aperture.

The support arm carrying the roller advantageously is rigidly clamped on the support rod, particularly on its first section. In this way, the support arm can be easily removed and also exchanged.

The roller is advantageously mounted on an arm that can be rigidly clamped in the support arm. This arm advantageously extends perpendicular to the support arm and can be easily exchanged as required.

In another advantageous embodiment, the pressure roller bracket can be adjusted in the axial direction of the support rod. This is required, for example, when the pressure roller is assigned to a tool that can be adjusted relative to the workpiece to be processed in the direction of the axis of the support rod.

The inventive processing machine provides the option of easily adjusting the pressure roller from the pressure position into the resting position by means of the adjusting device. It is advantageous if at least the pressure rollers, which are assigned to tools that are rotatable about vertical axes, are realized in an adjustable fashion.

In a simple constructive design, the support rod lies in the region above the machine table of the processing machine. In this case, the support arm extends obliquely downward from the support rod in the direction of the machine table.

A simple design is achieved if the support rod extends through the processing machine transverse to the transport direction of the workpieces. In this case, the support rod lies horizontally and perpendicular to the transport direction of the workpieces.

The processing machine is advantageously provided with at least one tool that can be adjusted transverse to the transport direction of the workpieces through the machine by means of a slide. Such a tool therefore can be adapted to different widths of the workpiece to be processed.

In order to ensure that the pressure roller assigned to the adjustable tool maintains its position relative to the tool during such an adjustment, the slide is in an inventive embodiment of the processing machine advantageously coupled to a pressure roller bracket in such a way that the pressure roller bracket can be adjusted transverse to the transport direction of the workpieces together with the slide. Consequently, an adjustment of the slide, as well as the tool seated thereon, inevitably leads to a corresponding adjustment of the pressure roller bracket and therefore the assigned pressure roller. Such an embodiment of a processing machine is not dependent on the remaining design, particularly of the support rod.

In a particularly advantageous embodiment, the adjusting motion of the pressure roller bracket is derived from the adjusting motion of the slide.

In this case, it is advantageous if the slide and the pressure roller bracket are connected to one another by means of at least one remote control. When the slide and therefore the tool are adjusted transverse to the transport direction of the workpieces, the pressure roller bracket is also carried along by means of the remote control such that the distance between the roller and the adjustable tool is maintained during the adjustment. A separate adjusting unit for the pressure roller bracket is therefore not required. The remote control makes it possible to realize the adjustment in a particularly cost-effective and reliably operating fashion.

The invention is not only defined by the subject matter of the individual claims, but also by all information and features disclosed in the drawings and the description. Even if they are not subject matter of the claims, they are claimed as being essential to the invention insofar as they are novel in comparison with the prior art individually or in combination.

Other features of the invention result from the other claims, the description and the drawings.

BRIEF DESCRIPTION OF THE DRAWINGS

The invention is described in greater detail below with reference to an exemplary embodiment that is illustrated in the drawings.

FIG. 4 shows the pressure roller located in front of the right spindle of the processing machine in its pressure position and the corresponding adjusting device.

FIG. 5 shows the adjusting device according to FIG. 4 in the form of a perspective view.

FIG. 6 shows the pressure roller according to FIG. 4 in the position, in which it is pivoted away.

FIG. 7 shows the pressure roller with adjusting device according to FIG. 6 in the form of a perspective view.

FIG. 8 shows the pressure roller according to FIG. 4 in a position, in which it can be pivoted out of the pressure position.

FIG. 9 shows a perspective view of a support rod of the adjusting device for the pressure roller.

FIG. 10 shows a side view of the support rod according to FIG. 9.

FIG. 11 shows a section along the line A-A in FIG. 10.

FIG. 12 shows a front view of the pressure roller bracket.

FIG. 13 shows the pressure roller bracket according to FIG. 12 in the form of a perspective view.

FIG. 14 shows the design of the inner contour of the clamping receptacle of the pressure roller bracket according to FIG. 12.

DESCRIPTION OF PREFERRED EMBODIMENTS

Figure 1:
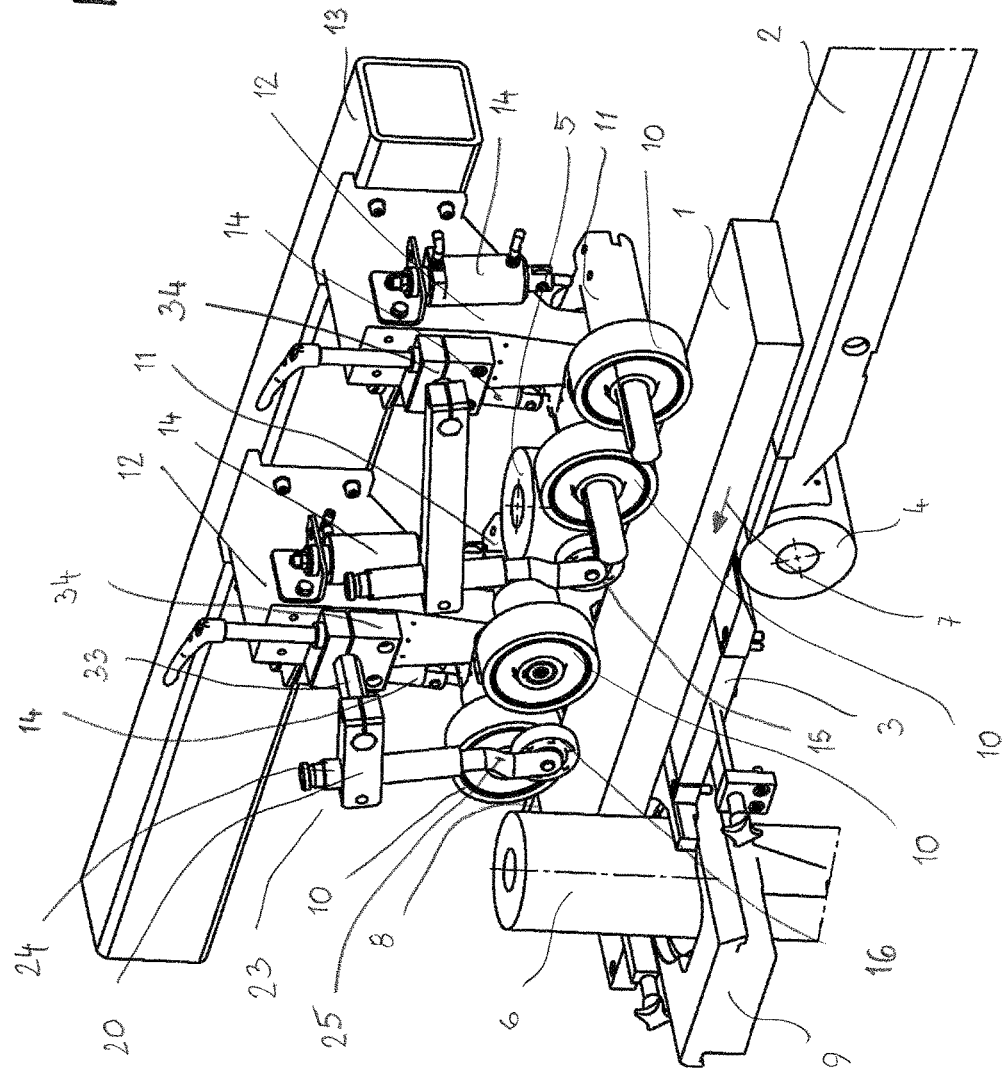
FIG. 1 shows a perspective view of an inventive processing machine with inventive adjusting devices for pressure rollers.

The processing machine advantageously is a moulding machine. It serves for processing workpieces 1 of wood that are supplied by means of an infeed table 2 and transported in the moulding machine on a machine table 3 while they are processed. In the moulding machine, the workpieces 1 are processed on all four sides while they pass through the moulding machine. A lower tool 4, which is rotatable about a horizontal axis, a right tool 5 and a left tool 6 are schematically illustrated in FIG. 1, in which only part of the moulding machine is shown. The two tools 5, 6 are rotatable about vertical axes. The lower tool 4 serves for processing the underside of the workpiece 1, the right tool 5 serves for processing the right longitudinal side with reference to the transport direction and the tool 6 serves for processing the left longitudinal side of the workpiece 1 with reference to the transport direction 7. The two vertical tools 5, 6 are offset relative to one another in the transport direction of the workpiece 1. The moulding machine also has a (not-shown) upper tool, which is rotatable about a horizontal axis and serves for processing the upper side of the workpiece 1 while it passes through the moulding machine, wherein this upper tool is arranged behind the left tool 6 with reference to the transport direction of the workpiece 1. An additional lower tool may furthermore be provided behind the upper tool with reference to the transport direction 7 of the workpiece 1 in order to once again process the underside of the workpiece 1 during its transport through the moulding machine. The workpiece 1 rests against stops 8 with its right longitudinal side with reference to the transport direction 7 while it passes through the moulding machine.

The left tool 6 is mounted on a spindle slide 9 that is arranged on the machine table 3 such that it can be displaced transverse to the transport direction 7. The slide 9 makes it possible to adjust the tool 6 to different widths of the workpieces 1.

Feed rollers 10 are provided for transporting the workpiece 1 through the moulding machine and rest on the upper side of the workpiece 1 in order to thereby transport the workpiece through the moulding machine in the transport direction 7. Two feed rollers 10 are respectively arranged on feed rockers 11 that are pivotably mounted on a rocker bracket 12. The rocker brackets 12 are fastened on a transport beam 13 that extends in the transport direction 7 a certain distance above the machine table 3. The rocker brackets 12 are detachably fastened on the transport beam 13. More than two rocker brackets 12, which respectively carry feed rockers 11 with transport rollers 10, may be fastened on the transport beam 13 depending on the length of the moulding machine. The feed rollers 10 are pressed against the upper side of the workpiece 1 with the aid of pressure cylinders 14, preferably pneumatic cylinders. The pressure cylinders 14 are mounted on the rocker brackets 12 and engage on the feed rockers 11.

Figure 2:
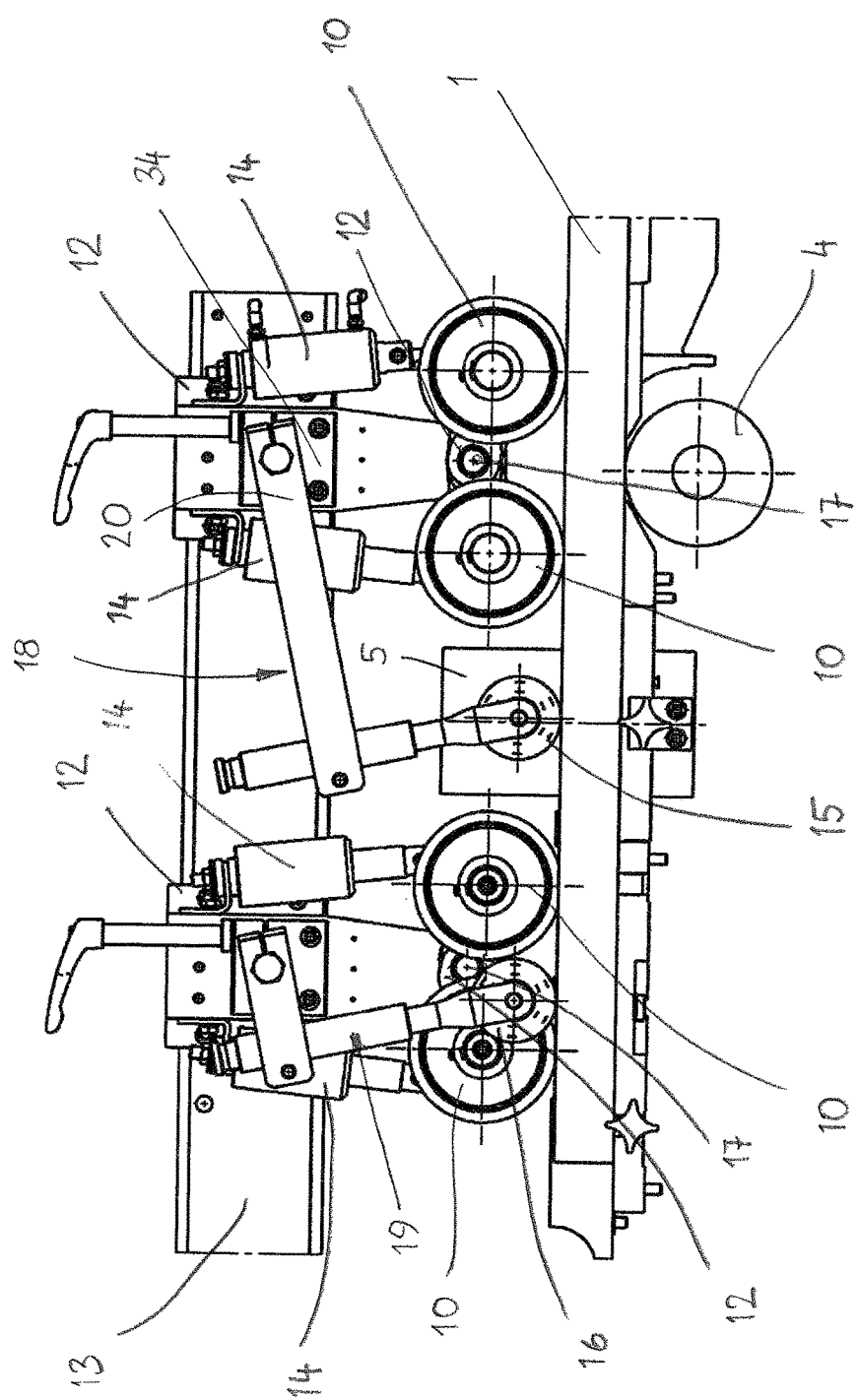
FIG. 2 shows a front view of the processing machine according to FIG. 1, in which the pressure rollers are in a pressure position.

The feed rockers 11 are of one-armed levers, one end of which is pivotably mounted on a common horizontal axis 17 (FIG. 2). The pressure cylinders 14 engage on the free ends of the feed rockers 11.

A pressure roller 15, 16 is respectively provided approximately at the height of the two tools 5, 6, wherein said pressure roller rests on the workpiece 1 under pressure and presses the workpiece against the machine table 3. The pressure rollers 15, 16 are freely rotatable about their horizontal axis and can be adjusted from the pressure position illustrated in FIG. 1 into an resting position when a tool change should be carried out or the pressure rollers are not needed.

The pressure rollers 15, 16 are advantageously supported in a spring-loaded fashion such that they can follow uneven areas on the surface of the workpieces 1 while the workpieces 1 pass through the moulding machine, wherein the workpiece 1 is subjected to or held with a sufficient force for preventing the workpiece 1 from getting stuck and/or being damaged. The pressure rollers 15, 16 can be pivoted from the pressure position (FIGS. 1 and 2) into an resting position (FIG. 3) with the aid of an adjusting unit 18, 19.

The adjusting unit 18 (FIGS. 4 and 5) has a support arm 20 that can be pivoted about a horizontal axis 21. On its free end that lies opposite of the pivoting axis 21, the support arm 20 is provided with a through-opening 22, through which an arm 23 protrudes. It has a housing 24 that contains a pressure medium, by means of which the pressure roller 15 is pressed in the direction of the workpiece 1. The pressure medium in the housing 24 advantageously consists of at least one pressure spring, but may also consist, for example, of a pneumatic medium. An axle 25 protruding from the housing 24 is acted upon by the pressure medium and carries on its free end the pressure roller 15 that is freely rotatable about the horizontal axis 26.

The through-opening 22 is located between two clamping sections 27, 28 (FIG. 7) that are provided on the free end of the support arm 20 and realized in one piece with this support arm. The two clamping sections 27, 28 are spaced apart from one another and connected to one another by a clamping screw 29 extending through both clamping sections. The arm 23 is inserted into the through-opening 22 and subsequently clamped between the two clamping sections 27, 28 by tightening the clamping screw 29. The clamping sections 27, 28 are designed in such a way that the edge of the through-opening 22 surrounds the arm 23 almost over the entire circumference. In this way, the arm 23 is securely held on the support arm 20. The clamping sections 27, 28 encompass the housing 24 of the arm 23 such that the axle 25 can carry out compensating motions as required while the workpieces 1 pass through the moulding machine.

The support arm 20, which is realized in the form of a one-armed lever, is in the region of its pivoting axis 21 provided with two additional clamping sections 30, 31 that are realized in one piece with the support arm 20 and connected to one another by means of a clamping screw 32. The clamping sections 30, 31 lie opposite of one another and are spaced apart by a short distance. The clamping sections 30, 31, as well as the clamping screw 32, lie perpendicular to the clamping sections 27, 28 and the clamping screw 29 provided on the other end of the support arm 20. The clamping sections 30, 31 encompass a support rod 33 that is held in a pressure roller bracket 34. It is fastened on the front side of the rocker bracket 12.

The support rod 33 has a polygonal shaft 35 that extends over part of the length of the support rod 33. In the exemplary embodiment, the length of the shaft 35 amounts to more than half the length of the support rod 33. For example, the shaft 35 has a hexagonal cross section.

A rotary section 36 is arranged axially adjacent to the shaft 35 and realized in one piece with the shaft 35. The rotary section 36 alternately has plane surfaces 37 and curved surfaces 38 over its circumference. The plane surfaces 37 form a continuation of the corresponding plane surfaces 39 of the shaft 35. Viewed in the axial direction of the support rod 33, the plane surfaces 37 lie centrally with reference to the plane surfaces 39 of the shaft 35, but have a smaller width than the surfaces 39. The curved surfaces 38 provided between the plane surfaces 37 lie on an imaginary cylinder 40 (FIG. 11), the diameter 41 of which is slightly greater than the distance 42 between the diametrically opposite plane surfaces 37. In the exemplary embodiment, the distance 42 amounts to 27 mm whereas the diameter 41 amounts to 28 mm. In this way, the curved surfaces 38 of the rotary section 36 form the functional surfaces that make it possible to turn the support rod 33 about its axis.

On its free end 43, the support rod 33 once again has the same polygonal contour as the shaft 35. This free end 43 only has a short length.

The support rod 33 lies between the clamping sections 30, 31 of the support arm 20 with its shaft 35. The clamping sections 30, 31 define a through-opening 44 (FIGS. 5 and 8) that has a polygonal contour corresponding to the shaft 35 of the support rod 33. In this way, the support arm 20 is reliably connected to the support rod 33 in a form-fitting fashion. The two clamping sections 30, 31 can be rigidly clamped on the shaft 35 of the support rod 33 with the clamping screw 32 provided in the region adjacent to the through-opening 44.

The pressure roller bracket 34 has an approximately cuboid design (FIGS. 12 and 13) and has a transverse slot 45 that perpendicularly extends from one narrow side 46 of the pressure roller bracket 34 close to the opposite narrow side 47. The transverse slot 45 also extends as far as into the opposite lateral surfaces 48, 49 of the pressure roller bracket 34 that lie perpendicular to the narrow sides 46, 47. In the exemplary embodiment, the transverse slot 45 is located off-centre eccentric in the pressure roller bracket 34.

The transverse slot 45 extends about centrally through an aperture 50 that lies between the opposite and parallel lateral surfaces 48, 49. Analogous to the contour of the rotary section 36 of the support rod 33, the contour of the aperture 50 is composed of curved (partially cylindrical) and plane surfaces.

According to FIG. 14, the aperture 50 has plane lateral surfaces 51 that extend over the length of the aperture 50 and respectively have a curved surface 52 at half their width. These curved surfaces 52 lie on an imaginary cylinder with the diameter 41. The plane lateral surfaces 51 are arranged in such a way that diametrically opposite lateral surfaces 51 are spaced apart from one another by the distance 42. As described above with reference to the rotary section 36 of the support rod 33, the diameter 41 is slightly greater than the distance 42 between diametrically opposite plane lateral surfaces 51. As an example, the diameter 41 indicated in FIG. 14 amounts to 28 mm and the distance 42 amounts to 27 mm. When the rotary section 36 is located in the aperture 50 of the pressure roller bracket 34, the only effective surfaces are the curved surfaces 52, against which the curved surfaces 38 of the rotary section 36 of the support rod 33 rest. The support rod 33 can then be turned about its axis. This axis forms the pivoting axis 21 (FIG. 5), about which the support arm 20 is pivoted in order to transfer the pressure roller 15 from the pressure position into the resting position.

Such an aperture 50 can be easily produced by initially producing a cylindrical bore and subsequently broaching the hexagon.

The transverse slot 45 extends so far in the direction of the narrow side 47 of the pressure roller bracket 34 that a bending region 53 is formed between the end of the transverse slot 45 and the narrow side 47. In this way, the upper section 54 can in the installed position be elastically bent by means of a clamping device 55 (FIG. 5) such that the shaft 35 or the rotary section 36 is clamped in the aperture 50. The clamping device 55 has a clamping lever 56, by means of which a clamping spindle 57 can be actuated. The clamping spindle 57 penetrates the clamping section 54, which is provided with a corresponding through-opening 58 (FIG. 13) for this purpose. The clamping spindle 57 is provided with a collar 59 that rests on the clamping section 54. The clamping spindle 57 traverses the transverse slot 45 in the region adjacent to the aperture 50 and is screwed into the part 60 of the pressure roller bracket 34 that is located underneath the clamping section 54.

When the pressure roller 15 is in its pressure position as illustrated in FIGS. 1, 2, 4 and 5, the support rod 33 is pushed into the pressure roller bracket 34 to such a degree that the shaft 35 lies in the aperture 50. The clamping section 54 is rigidly clamped against the shaft 35 by means of the clamping device 55. Since the shaft 35 only has the plane surfaces 39, these plane surfaces cooperate with the lateral surfaces 51 of the aperture 50. In this way, a reliable form-fit is produced such that the support arm 20 cannot be pivoted about the axis 21. The shaft 35 also protrudes into the angular through-opening 44 of the support arm 20 that is rigidly clamped on the shaft 35 with the aid of the clamping screw 32.

The roller 15 can be continuously adjusted perpendicular to the support arm 20 by means of the arm 23. The arm 23 is rigidly clamped between the two clamping sections 27, 28 with the aid of the clamping screw 29.

Figure 3:
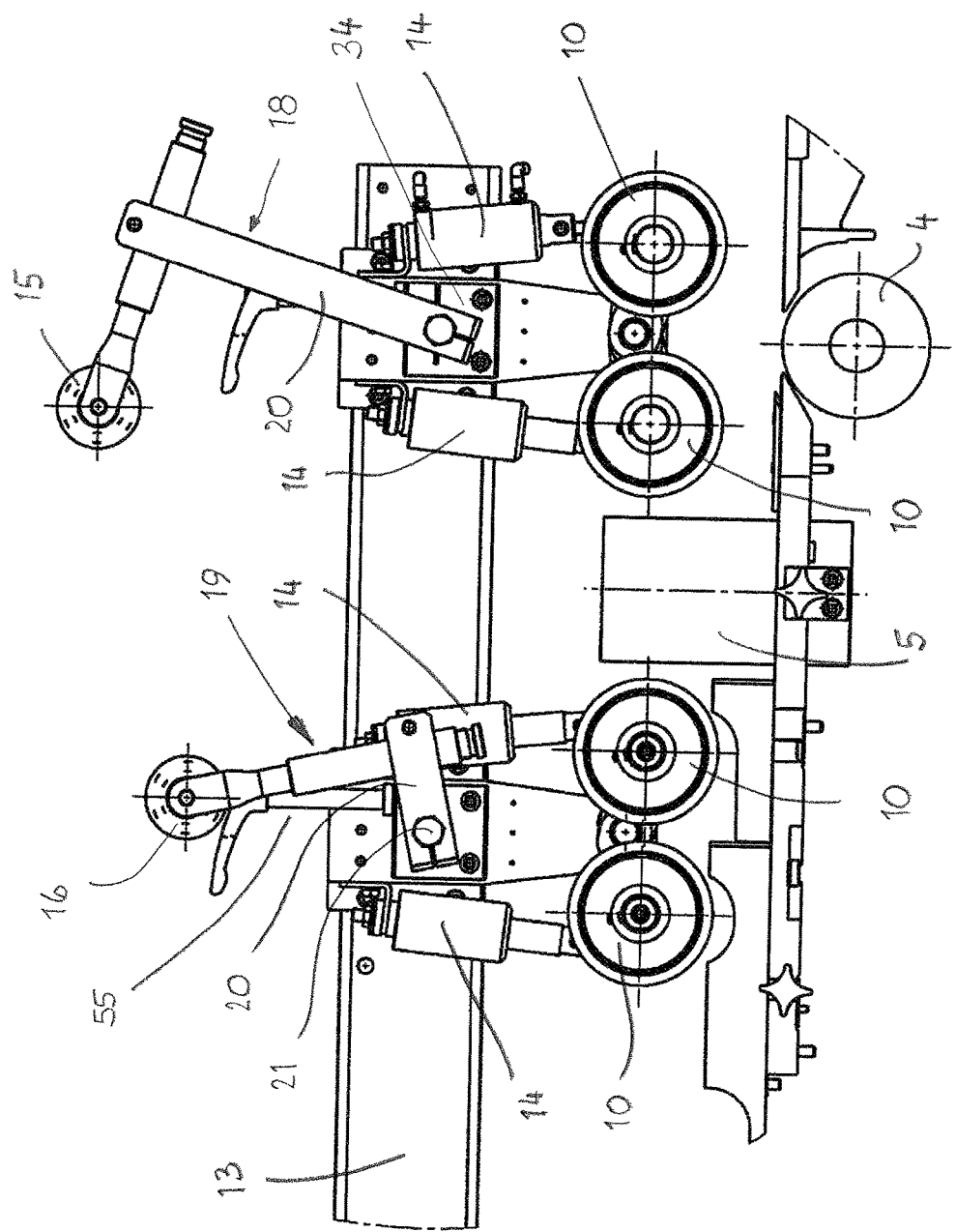
FIG. 3 shows an illustration of the processing machine corresponding to FIG. 2, in which the pressure rollers are pivoted away.

When the pressure roller 15 needs to be adjusted into the resting position illustrated in FIGS. 3 and 6, the support rod 33 clamped in the pressure roller bracket 34 is initially released by means of the clamping device 55. The support rod 33 can then be pulled out of the pressure roller bracket 34 in its longitudinal direction to such a degree that the rotary section 36 of the support rod 33 lies in the aperture 50 of the pressure roller bracket 34. Since the curved surfaces 52 of the aperture 50 lie on a cylindrical surface, the diameter 41 of which is slightly greater than the distance 42 between the diametrically opposite plane lateral surfaces 51, the support rod 33 can be turned about its axis in the aperture 50 because only the curved surfaces 38, 52 are functional surfaces in this case. Consequently, the support arm 20 can be pivoted about the pivoting axis 21 upward into the resting position, in which the pressure roller 15 is located in the region above the transport beam 13 (FIG. 3). In order to ensure that the support arm 20 does not pivot back in the direction of its pressure position, the clamping section 54 of the pressure roller bracket 34 is damped against the rotary section 36 by means of the clamping device 55.

It is also possible to once again push back the support rod 33 after this pivoting process such that the shaft 35 lies in the pressure roller bracket 34. The support rod 33 can then be secured against turning such that the support arm 20 cannot be pivoted back from the resting position into the pressure position. In a hexagonal design, the support rod 33 and therefore the support arm 20 can in the clamped resting position assume defined angular positions (60°, 120°, 180° . . . ) relative to the pressure position.

The free end 43 of the support rod 33, which has the same cross section as the shaft 35, prevents the support rod 33 from being pulled out of the pressure roller bracket 34 during the pivoting motion. This can be realized along with a removal of the pressure roller in the angular position, in which the hexagons of the clamping aperture 50 and the free end 43 are aligned. In a not-shown design that, however, is slightly more elaborate, the support rod can also be prevented from being pulled out by installing a disc with greater diameter than the hexagon on the free end 43 after the support rod 33 was inserted into the clamping aperture 50.

The lower part 60 of the pressure roller bracket 34 contains two through-openings 61 that end in the opposite lateral surfaces 48, 49 of the pressure roller bracket 34 and through which protrude screws, by means of which the pressure roller bracket 34 can be fastened on the rocker bracket 12.

The pressure roller 15 is located at the height of the right tool 5. According to FIG. 1, the pressure roller 15 is located between two feed rollers 10. In the exemplary embodiment, the pressure roller 15 lies between two pairs of rollers. The support arm 20 therefore is relatively long because it is pivotably mounted on the pressure roller bracket 34 fastened on the rocker bracket 12.

The other pressure roller 16 is located at the height of the left tool 6, as well as in the region adjacent to the feed rollers 10. This pressure roller 16 is also held on the pressure roller bracket 34 analogous to the pressure roller 15. The pressure roller 16 is mounted on the lower end of the arm 23 such that it is freely rotatable about a horizontal axis. As described above, the arm 23 has the housing 24, from which the axle 25 carrying the roller 16 protrudes. A pressure medium, preferably a pressure spring, is accommodated in the housing 24 in order to support the pressure roller 16 in a spring-loaded fashion. The housing 23 is clamped in the support arm 20 as described above. The support arm 20 is shorter than the support arm 20 of the pressure roller 15 because the pressure roller 16 is located approximately at the height of the rocker bracket 12. The support arm 20 is seated on the support rod 33 that is designed in the above-described fashion and can be rigidly clamped in the pressure roller bracket 34. With the exception of the different length of the support arm 20 and, if applicable, a longer support rod with a longer shaft region in order to realize a broader adjusting range in the direction of the width of the workpiece, the entire adjusting device for the pressure roller 16 is realized identical to the adjusting device for the pressure roller 15 such that we refer to the corresponding description in this respect.

FIGS. 15 to 18 show an embodiment of the adjusting device for the pressure roller 16 that is designed for instances, in which the pressure roller can be adjusted transverse to the transport direction 7 of the workpiece 1 together with the left tool 6. The adjustment of this tool 6 is realized with the slide 9, which is mounted such that it can be displaced on the machine table 3 perpendicular to the transport direction 7. In this way, the position of the left tool 6 can be adapted to the width of the workpiece 1.

In order to ensure that the pressure roller 16 is carried along to the same extent during this adjustment of the tool 6, it is coupled with the slide 9 by means of a remote control 62. Forces can be transmitted in both directions with the remote control 62. A cover 63 of the remote control 62 is fastened on a bracket 64 that in turn is fastened on the slide 9. The core 65 of the remote control 62 consists of layered spring steel strips that are supported against one another and against semicircular guide strips. Remote controls of this type are known, for example, under the designation "FLEX-BALL remote controls." The core 65 of the remote control is with one end fastened on an angle bracket 66 that is stationarily mounted on the (not-shown) machine tool table.

Figure 15:
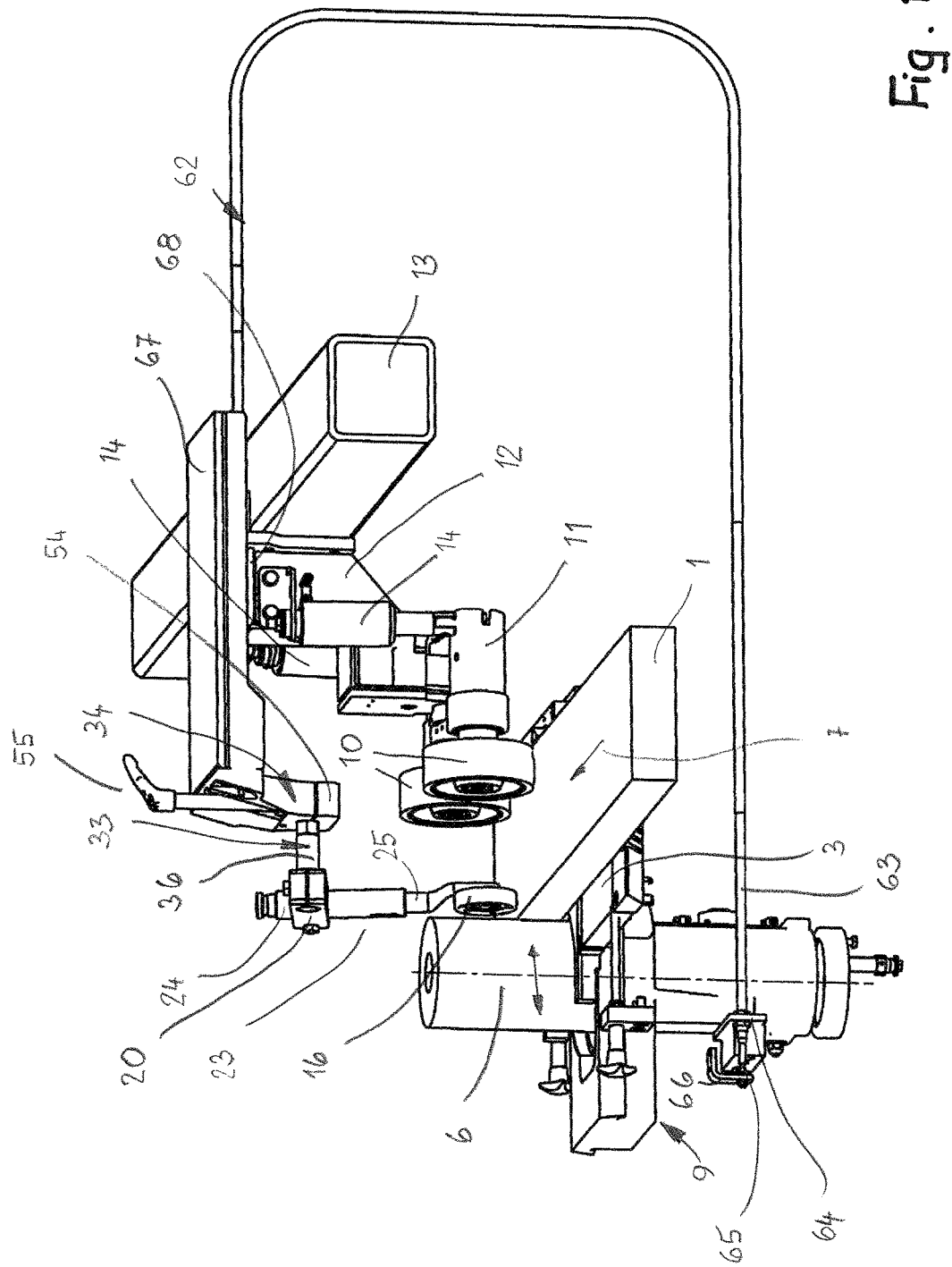
FIG. 15 shows a perspective view of part of the processing machine with a pressure roller that can be adjusted by means of a remote control.
Figure 16:
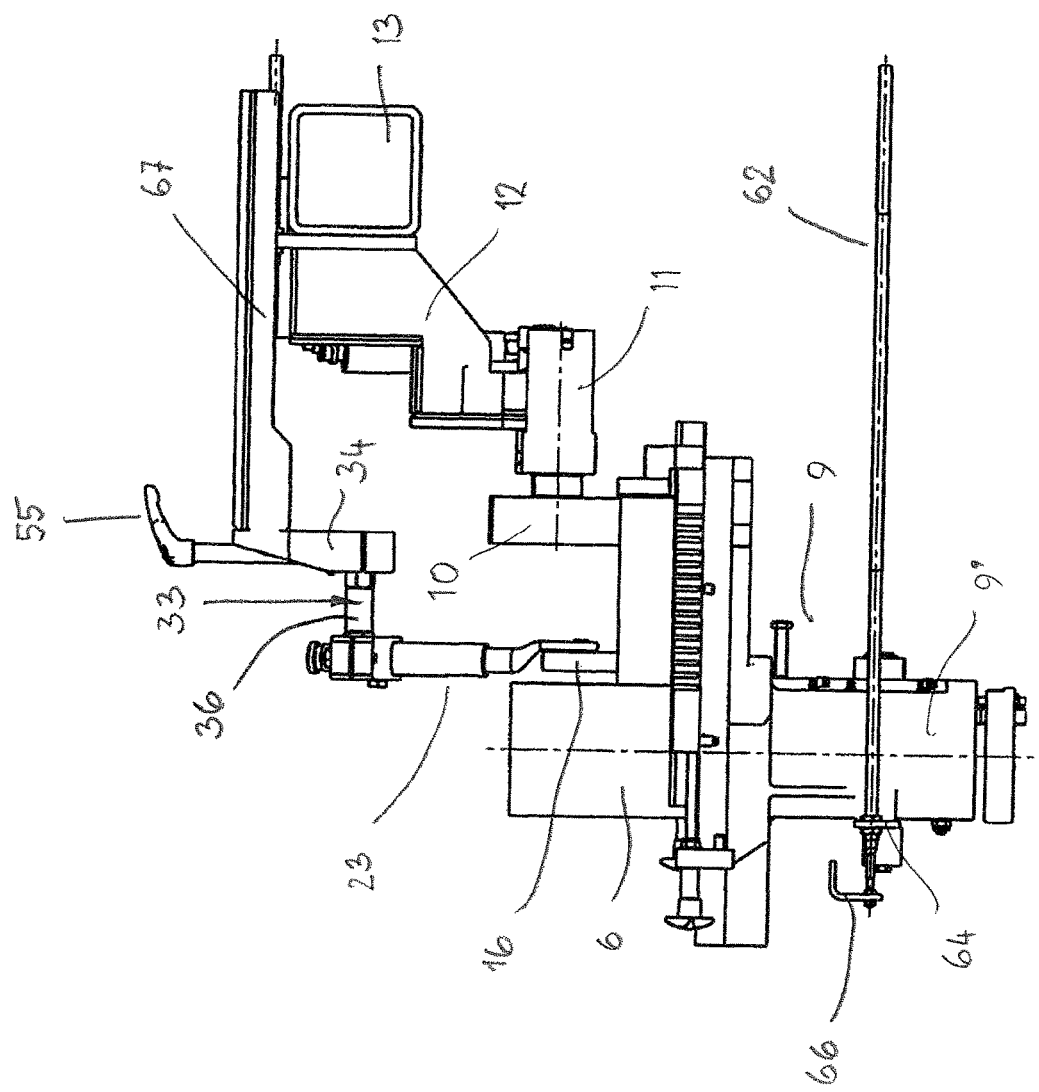
FIG. 16 shows the part of the processing machine according to FIG. 15 in the form of a side view.

The other end of the remote control 62 is fastened on an extension arm 67 of the pressure roller bracket 34 (FIG. 15). The extension arm 67 extends perpendicular to the transport beam 13 and can be displaced perpendicular to the transport direction 7 of the workpiece 1 along a guide 68. The guide 68 is provided on the upper end of the rocker bracket 12. The pressure roller bracket 34 with the clamping section 54 and the clamping device 55, by means of which the support rod 33 can be held in the pressure roller bracket 34 in the above-described fashion, is provided on the end of the extension arm 67 that faces away from the transport beam 13. The pressure roller bracket 34 and the clamping device 55 are designed as described above. The support arm 20 is seated on the support rod 33 in the above-described fashion and carries the arm 23, on the lower end of which the freely rotatable pressure roller 16 is mounted.

Figure 19:
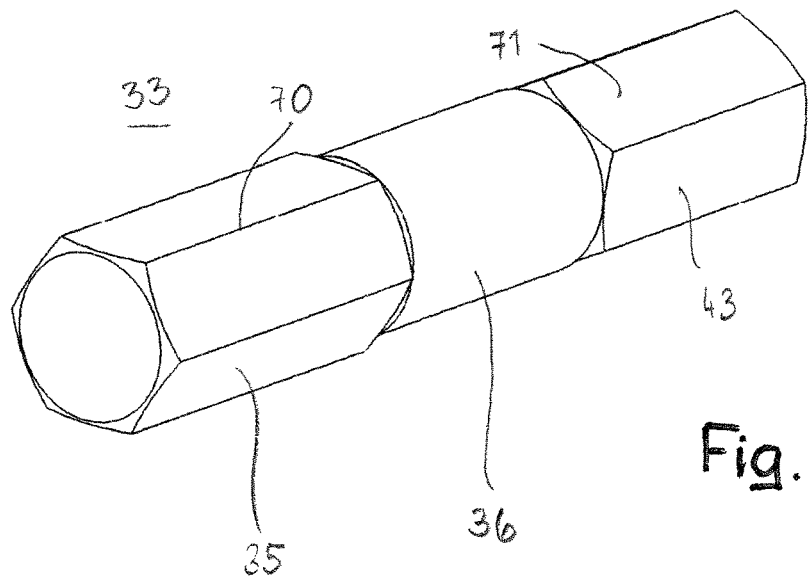
FIG. 19 shows a perspective view of another embodiment of a support rod.

In this case, the support rod 33 has a cylindrical rotary section 36 (FIG. 19) with the diameter 41. In order to adjust the pressure roller 16 from the pressure position into the resting position, the support rod 33 is axially displaced as described above such that the cylindrical rotary section 36 lies in the pressure roller bracket 34. Since the rotary section 36 is designed cylindrically, the rotary section 36 of the support rod 33 is reliably clamped in any angular position. Consequently, the pressure position of the pressure roller 16 can also be used in an axial position of the support rod 33, in which the rotary section 36, as well as the shaft 35, is positioned in the aperture 50 of the pressure roller bracket 34. In order to produce the form-fit, it suffices if a short length such as, for example, 5 mm of the support rod 3 or its shaft 35 respectively lies within the aperture 50. Since the support rod 33 is in this embodiment also clamped on the cylindrical rotary section 36 in the angular position of the hexagon, the support rod 33 is clamped in the pressure roller bracket 34 without clearance over the entire clamping or fixing length. In contrast to the support rod 33 according to FIGS. 9 to 11, the support rod 33 according to FIG. 19 is manufactured, for example, of round stock, on which merely the hexagon surfaces are milled.

Due to this manufacturing process, the shaft 35 and the section 43 may also be arranged such that they are turned relative to one another and the plane surfaces of these two parts of the support rod 33 are also turned relative to one another. This makes it possible to achieve different angular positions between the pressure position and the resting position, for example, if the shaft 35 is used for clamping the support rod in the pressure position and the section 43 is used for clamping the support rod in the resting position. The two sections 35, 43 of the support rod 33 respectively have the same hexagonal contour. In the exemplary embodiment, the angular offset between the two sections 35, 43 is chosen such that the plane surfaces of both sections respectively are angularly offset relative to one another by 30°. In this way, the axially parallel edges 70 lie between the plane surfaces of the shaft 35, namely at half the width of the plane surfaces 71 of the section 43 of the support rod 33 viewed in the axial direction of the support rod 33.

The slide 9 has a downwardly protruding slide part 9', on which the bracket 64 for the remote control 62 is fastened. The slide 9 is conventionally adjusted perpendicular to the transport direction 7 of the workpiece 1.

Figure 17:
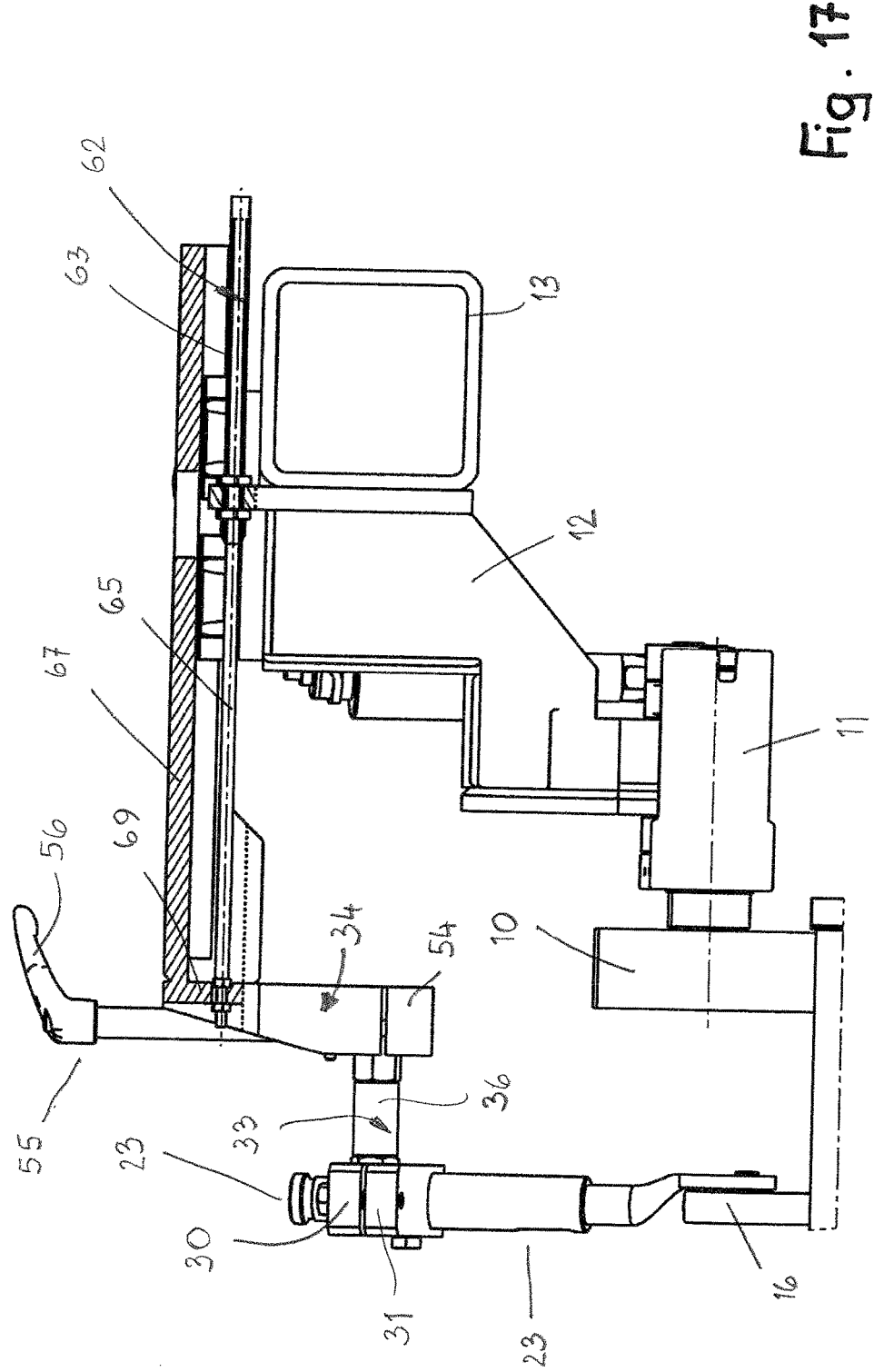
FIG. 17 shows an enlarged and partially sectioned view of the part of the processing machine according to FIG. 16.
Figure 18:
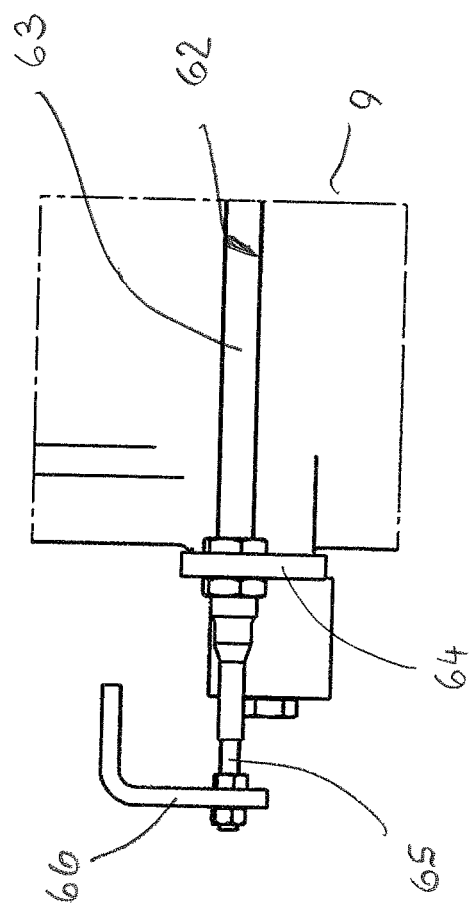
FIG. 18 shows an enlarged view of the mounting of the remote control on a spindle slide.

According to FIG. 17, the extension arm 67 has in the region of the pressure roller bracket 34 an angled edge 69, on which one end of the core 65 of the remote control 62 is fastened. The cover 63 of the remote control 62 is fastened on the rocker bracket 12 with its adjacent end.

When the slide 9 is adjusted transverse to the transport direction 7 of the workpiece 1 together with the tool 6, the pressure roller bracket 34 and therefore also the roller 16 is correspondingly carried along by means of the remote control 62 such that the distance between the tool 6 and the pressure roller 16 remains the same regardless of the position of the tool 6. The flexible remote control 62 extends through the moulding machine in such a way that it does not impair the transport of the workpieces 1 through the moulding machine and the adjustment of machine components.

The pressure roller 16 can be adjusted from the pressure position illustrated in FIGS. 1 and 2 into the resting position illustrated in FIG. 3. For this purpose, the support arm 20 is pivoted upward about the pivoting axis 21 as described above with reference to the pressure roller 15 such that the pressure roller 16 is in the resting position located in the region above the transport beam 13. The support arm 20 is held in this resting position by rigidly clamping the support rod 33 in the receptacle 50 of the pressure roller bracket 34 by means of the clamping device 55. In order to pivot the support arm 20 upward, the support rod 33 clamped in the aperture 50 of the pressure roller bracket 34 is released as described above. The support rod 33 can then be pushed out of the aperture 50 to such a degree that the rotary section 36 lies in the aperture 50. The curved surfaces 38, 52 of the rotary section 38 of the support rod 33 and of the aperture 50 now make it possible to turn the support rod 33 about its axis such that the support arm 20 is pivoted. In the upwardly pivoted position, the clamping device 55 is once again used for clamping the clamping section 54 of the pressure roller bracket 34 against the rotary section 36 of the support rod 33 or against the shaft 35 or the section 43 if the support rod 33 was once again axially displaced into the clamping region of the pressure roller bracket 34 with the shaft 35 or the section 43.

If the moulding machine does not have a pressure roller 16 that can be adjusted transverse to the transport direction 7 of the workpiece 1 together with the adjustable tool 6, the coupling of the pressure roller bracket 34 to a slide by means of a remote control is also not provided in the moulding machine. In this case, the adjusting unit 19 for the pressure roller 16 is realized identical to the adjusting unit 18 for the pressure roller 15 (with the exception of the different length of the support arm 20 and of the support rod 33). The axial transverse adjustment of the pressure roller is then realized exclusively by adjusting the axial position of the support rod 33 in the pressure roller bracket 34. In this case, the shaft 35 of the support rod 33 must have a corresponding length. In addition, the optional displacement must be constructively realized. For example, the rocker bracket 12 has a bore and corresponding clearance for displacing the support rod 33 into the rocker bracket 12 in extension of the aperture 50. If applicable, the transport beam 13 may also contain a corresponding bore such that a correspondingly long support rod 33 can be displaced into the transport beam 12 when the left spindle and the pressure roller are in a working position for processing narrow workpieces.

The pressure rollers 15, 16 can be reliably adjusted between the pressure position and the resting position. Since the support rod 33 has a polygonal contour, a reliable form-fit between the support rod 33 and the pressure roller bracket 34 is produced. When the clamped support rod 33 is loosened, the polygonal contour of the shaft 35 of the support rod 33 ensures that the adjustment of the support rod and therefore the support arm 20 does not change. If a tool change should be carried out, the pressure rollers 15, 16 can be very easily pivoted away in the above-described fashion. In this way, a tool change can be quickly carried out. In the resting position, the pressure rollers 15, 16 lie outside the region of the tools such that they do not impair the tool change. If the pressure rollers are not needed for a processing task or cannot be used, e.g., because they would form an obstruction, they can be adjusted into and remain in the resting position. The adjustment of the pressure rollers 15, 16 between the resting position and the pressure position can be easily realized by pivoting the support arm 20. No elaborate adjusting units or elaborately actuated adjusting units are provided for this purpose.

A support rod 33 of the type described with reference to FIGS. 9 to 11 or FIG. 19 may be respectively used for both pressure rollers 15, 16. For example, the support rod 33 for adjusting the pressure roller 16 may have a design of the type described with reference to FIGS. 9 to 11. Vice versa, a support rod 33 corresponding to the embodiment according to FIG. 19 may be used for the adjustment of the pressure roller 15.

Figure 20:
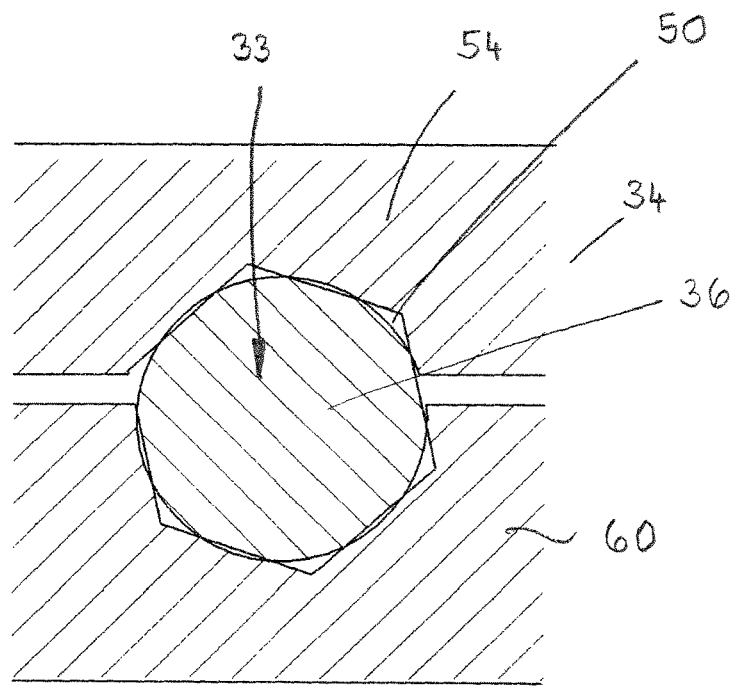
FIGS. 20 to 24 show enlarged and sectioned views of different angular positions of the support rod in the clamping aperture of the pressure roller bracket.

The described clamping effect in the region of the shaft 35 and the rotary section 36 is elucidated below with reference to FIGS. 20 to 23. FIG. 20 shows an enlarged illustration of the pressure roller bracket 34 with the clamping section 54 and the part 60. The support rod 33 assumes such a position that its rotary section 36 lies in the clamping aperture 50 of the pressure roller bracket 34. The rotary section 36 is designed in accordance with FIGS. 9 to 11. The support rod 33 assumes such a position (angular position) that it can be axially displaced in the clamping aperture 50, i.e. the hexagonal cross sections of the shaft 35 and the clamping aperture coincide. In this angular position, the support rod 33 cannot be clamped in the clamping aperture 50 because no overlapping region between the curved surfaces of the rotary section 36 and the aperture 35 exists, but only the edges between the surfaces rest against one another.

Figure 21:
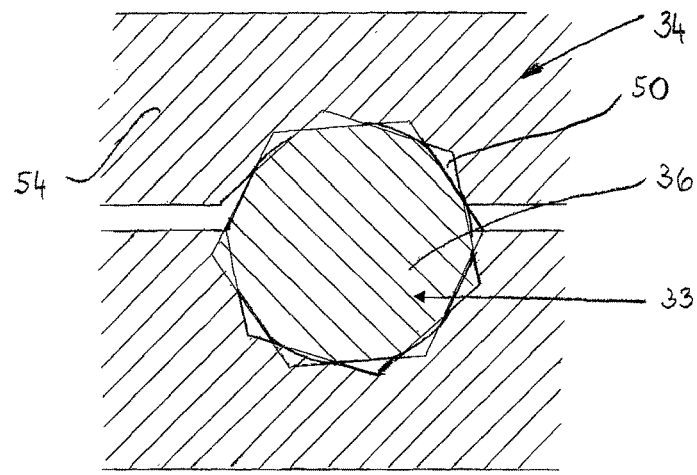

FIG. 21 shows the situation, in which the rotary section 36 of the support rod 33 is turned to such a degree that the curved surfaces of the rotary section 36 and of the wall of the aperture 50 of the pressure roller bracket 34 overlap one another. In the position according to FIG. 21, the support rod 33 can be clamped in the rotary section 36 by means of the clamping section 54.

Figure 22:
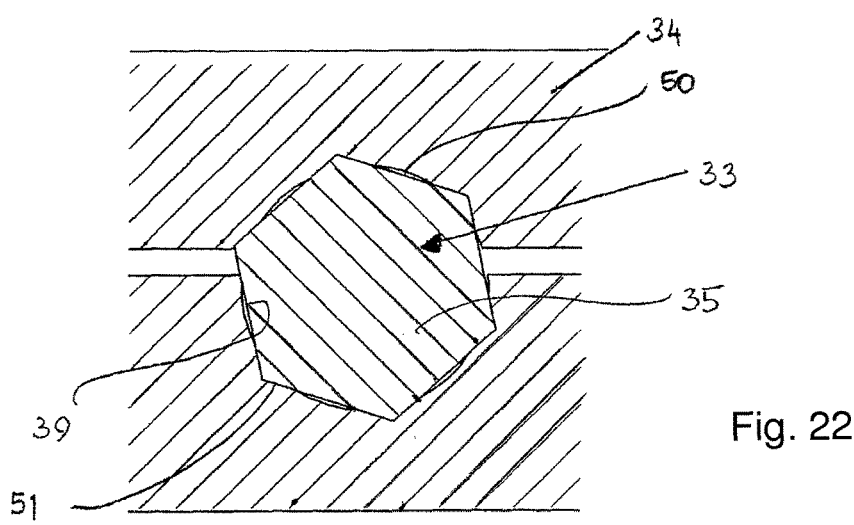

In FIG. 22, the shaft 35 of the support rod 33 is located in the aperture 50 of the pressure roller bracket 34. The plane surfaces 39 of the shaft 35 rest against the plane surfaces 51 in the wall of the aperture 50. In this case, the support rod 33 is clamped in the clamping aperture 50 in a form-fitting fashion.

Figure 23:
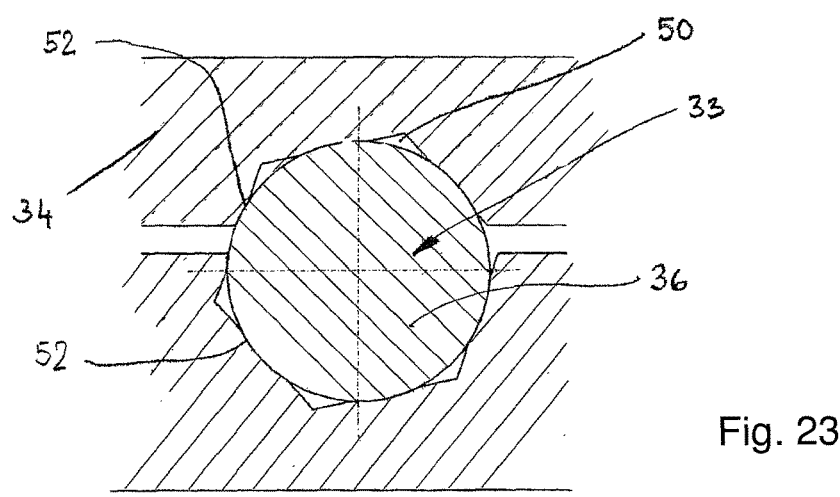
Figure 24:
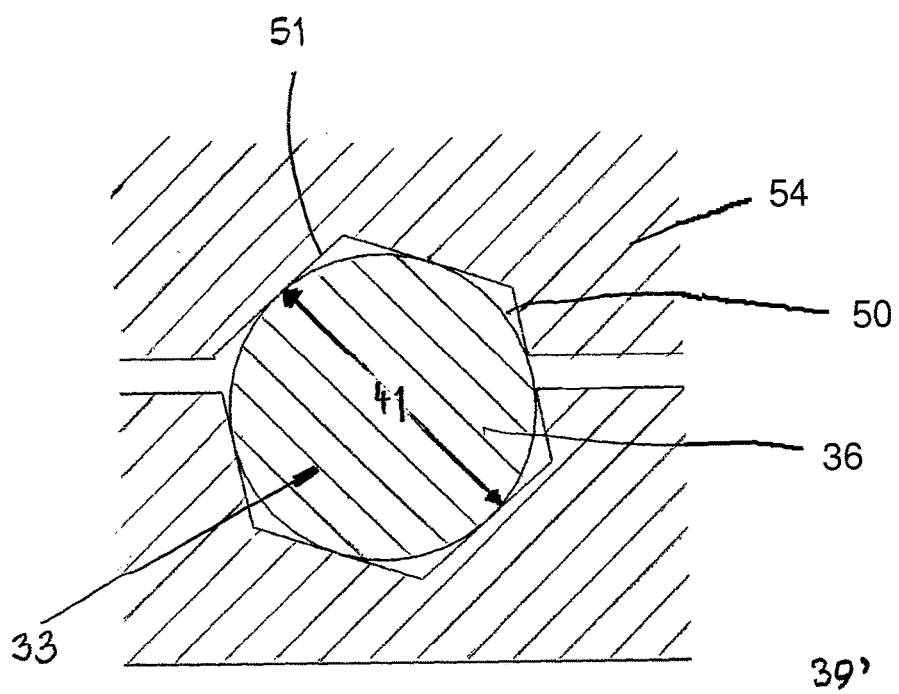

FIG. 23 shows a design of the support rod 33 that corresponds to FIG. 19. The rotary section 36 lying in the aperture 50 of the pressure roller bracket 34 has the cylindrical surface area. It engages into the curved surfaces 52 in the wall of the aperture 50. In this way, the cylindrical rotary section 36 of the support rod 33 is clamped in the aperture 50 of the pressure roller bracket 34 in any angular position, particularly also in an angular position, in which the hexagonal cross sections of the shaft 35 and the clamping aperture 50 coincide. As described above, it is in this case also possible to use and reliably clamp the pressure roller 16 in a form-fitting fashion in an axial position of the support rod 33, in which the rotary section 36 as well as the shaft 35 lie in the aperture 50 of the pressure roller bracket 34.

Figure 25:
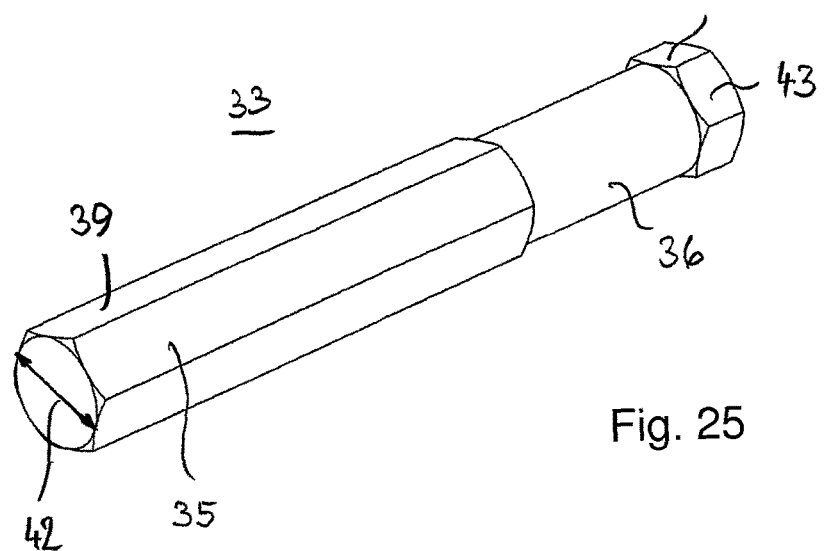
FIG. 25 shows a perspective view of another exemplary embodiment of a support rod.

FIG. 25 shows a support rod that is essentially realized identical to the support rod according to FIGS. 9 to 11. The distinction can be seen in that the rotary section 36 between the hexagonal shaft 35 and the hexagonal end section 43 is realized cylindrically. The shaft 35 and the end section 43 of the support rod 33 are arranged relative to one another in such a way that their plane surfaces 39, 39' respectively lie in common planes. The cylindrical rotary section 36 has a diameter 41 that is identical to the distance 42 between the diametrically opposite plane surfaces 39, 39' of the shaft 35 and of the end section 43 and therefore corresponds to the diameter of the inscribed circle of the shaft cross section. In a support rod according to the exemplary embodiment illustrated in FIGS. 9 to 11, this would amount, for example, to 27 mm. In such a design of the support rod 33, the aperture 50 in the pressure roller bracket 54 can have a hexagonal contour. The wall of the aperture 50 therefore consists of plane surfaces 51 that in contrast to the previously described exemplary embodiments have no curved surfaces. When the rotary section 36 is located in the aperture 50, the support rod 33 can be turned about its axis. The support rod 33 can also be clamped in the aperture 50 in the region of the rotary section 36 by means of the clamping section 54 in any angular position. In this case, line contact between the cylindrical surface area and the hexagonal surfaces is produced parallel to the axis of the support rod over the depth of the clamping aperture of the pressure roller bracket. If the support rod 36 is displaced in such a way that its shaft 35 lies in the aperture 50, the shaft 35 also can be reliably clamped in the aperture 50, in which case the plane surfaces 39, 51 of the shaft and the wall of the aperture 50 flatly rest against one another.

In another (not-shown) embodiment, the second section 36 of the support rod 33 can also be realized in such a way that the cylindrical surface area is approximated with a polygonal cross-sectional design. For example, the second section 36 may have a cross section with twelve edges or twenty-four edges. In this case, the edges between the plane polygon surfaces lie on the diameter of the cylindrical surface area. When the second section 36 is located in the clamping aperture 50 of the pressure roller bracket 34, the edges of the second section 36 of the support rod 33 rest against the inner side 51 of the clamping aperture 50 with line contact. A thusly designed support rod 33 also can be turned about its axis in the clamping aperture 50.

The specification incorporates by reference the entire disclosure of German priority document 10 2014 016 630.9 having a filing date of Nov. 4, 2014.

While specific embodiments of the invention have been shown and described in detail to illustrate the inventive principles, it will be understood that the invention may be embodied otherwise without departing from such principles.

What is claimed is:

1. An adjusting device for a pressure roller of a processing machine for workpieces of wood and plastic, the adjusting device comprising:
   a support arm configured to pivot about an axis;
   a pressure roller supported on the support arm and adjustable from a pressure position into a resting position by pivoting the support arm about the axis;
   a pressure roller bracket comprising a clamping aperture;
   a support rod that engages the clamping aperture of the pressure roller bracket,
   wherein the support rod (33) comprises a first section (35) with a noncircular cross section that forms a form-fit section and is configured to cooperate with the clamping aperture of the pressure roller bracket with form fit when the first section is positioned in the clamping aperture;
   wherein the support rod (33) comprises a second section (36) that is arranged axially adjacent to the first section (35) and forms a rotary section, wherein the second section is configured to rest against an inner side of the clamping aperture (50) and to rotate about a longitudinal axis of the support rod in the clamping aperture (50) of the pressure roller bracket (34) when the second section is positioned in the clamping aperture.

2. The adjusting device according to claim 1, wherein the second section (36) of the support rod (33) has a cylindrical surface area.

3. The adjusting device according to claim 2, wherein a diameter (41) of the cylindrical surface area corresponds to an inscribed circle diameter of an angular cross section of the first section (35), and wherein the cylindrical surface area of the second section (36) rests against plane surfaces of the inner side of the clamping aperture (50) of the pressure roller bracket (34) and enables the second section to rotate about the longitudinal axis, wherein an angular cross section of the clamping aperture (50) corresponds to the angular cross section of the first section (35) of the support rod (33).

4. The adjusting device according to claim 3, wherein the cylindrical surface area of the second section (36) of the support rod (33) rests against corresponding partially cylindrical surfaces (52) of the inner side of the clamping aperture (50) of the pressure roller bracket (34), wherein the inner side of the clamping aperture has the plane surfaces and the partially cylindrical surfaces alternately arranged in a circumferential direction of the clamping aperture and enables the second section to rotate about the longitudinal axis.

5. The adjusting device according to claim 1, wherein the second section (36) of the support rod (33) comprises plane outer sides (37) and curved outer sides (38) arranged alternately in a circumferential direction of the second section, wherein the plane outer sides are set back in a radial direction of the second section relative to the curved outer sides so far that the curved outer sides (38) form functional surfaces, wherein the clamping aperture comprises curved inner surfaces and plane inner surfaces arranged alternately in a circumferential direction of the clamping aperture, wherein the curved outer sides of the second section rest against the curved inner surfaces of the clamping aperture (50) and enable the second section to rotate.

6. The adjusting device according to claim 5, wherein the curved outer sides (38) of the second section (36) of the support rod (33) and the curved inner surfaces of the clamping aperture (50) lie on the surface area of an imaginary cylinder, the axis of which forms the pivoting axis (21) of the support arm (20).

7. The adjusting device according to claim 5, wherein the plane outer sides (37) of the second section (36) are continuous continuations of plane outer sides (39) of the first section (35) of the support rod (33).

8. The adjusting device according to claim 6, wherein the diameter (42) of the surface area of the imaginary cylinder is greater than the distance (42) between opposite plane outer sides (37, 51) of the second section (36) of the support rod (33) and of the clamping aperture (50).

9. The adjusting device according to claim 1, wherein the second section (36) lies between the first section (35) and an end section (43) of the support rod (33).

10. The adjusting device according to claim 9, wherein the end section (43) has the same cross section as the first section (35).

11. The adjusting device according to claim 9, wherein the first section (35) and the end section (43) of the support rod (33) are angularly offset to one another.

12. The adjusting device according to claim 1, wherein the support rod (33) can be displaced in the clamping aperture (50) in such a way that the first section (35) can be clamped in the clamping aperture (50) in the pressure position of the pressure roller (15, 16) and the second section (36) or the first section (35) can be clamped in said clamping aperture (50) in the pivoted resting position.

13. The adjusting device according to claim 1, wherein the support rod (33) comprises an end section adjacent to the second section and remote from the first section, wherein the first section, the second section, and the end section are all configured to be clamped in the clamping aperture (50).

14. The adjusting device according to claim 1, wherein the pressure roller bracket (34) has at least one clamping section (54) that exerts the clamping force upon the support rod (33) and is connected to the remaining part (60) of the pressure roller bracket (34) by means of a bending region (53).

15. The adjusting device according to claim 14, wherein the clamping section (54) is separated from the remaining part (60) of the pressure roller bracket (34) by a transverse slot (45) that extends over part of the width of the pressure roller bracket (34).

16. The adjusting device according to claim 15, wherein the transverse slot (45) extends through the clamping aperture (50).

17. The adjusting device according to claim 1, wherein that the support arm (20) is rigidly clamped on the support rod (33).

18. The adjusting device according to claim 1, wherein the roller (15, 16) is supported on an arm (23) that is rigidly clamped in the support arm (20).

19. The adjusting device according to claim 1, wherein the pressure roller bracket (34) can be adjusted in the axial direction of the support rod (33).

20. A processing machine with an adjusting device according to claim 1.

21. The processing machine according to claim 20, wherein the support rod (33) lies in the region above a machine table (3).

22. The processing machine according to claim 20, wherein the support rod (33) extends transverse to the transport direction (7) of the workpieces (1) through the processing machine.

23. The processing machine according to claim 20, wherein the processing machine has at least one tool (6) that can be adjusted transverse to the transport direction (7) of the workpieces (1) by means of a slide (9).

24. The processing machine according to claim 23, wherein the slide (9) is coupled to a pressure roller bracket (34) in such a way that the pressure roller bracket (34) can be adjusted transverse to the transport direction (7) of the workpieces (1) together with the slide (9).

25. The processing machine according to claim 24, wherein the adjusting motion of the pressure roller bracket (34) is derived from the adjusting motion of the slide (9).

26. The processing machine according to claim 24, wherein the slide (9) and the pressure roller bracket (34) are connected to one another by means of at least one remote control (62).

\* \* \* \* \*